United States Patent

Burgdorf et al.

[11] Patent Number: 4,728,156
[45] Date of Patent: Mar. 1, 1988

[54] APPARATUS FOR MONITORING THE AUXILIARY ENERGY PRESSURE OF A SLIP-CONTROLLED BRAKE SYSTEM AND SWITCH FAILURE INDICATING ARRANGEMENT THEREFOR

[75] Inventors: Jochen Burgdorf, Offenbach-Rumpenheim; Lutz Weise, Mainz, both of Fed. Rep. of Germany

[73] Assignee: Alfred Teves GmbH, Frankfurt am Main, Fed. Rep. of Germany

[21] Appl. No.: 734,652

[22] Filed: May 15, 1985

[30] Foreign Application Priority Data

May 15, 1984 [DE] Fed. Rep. of Germany ....... 3418042

[51] Int. Cl.$^4$ ............................................... B60T 8/88
[52] U.S. Cl. .................................... 303/92; 303/114; 303/119; 303/DIG. 4; 303/20
[58] Field of Search .................... 303/92, 93, 100, 20, 303/10–12, 114, 91, DIG.1, DIG. 2, DIG. 3, DIG. 4, 116, 119, 113, 102, 103; 60/545, 547.1; 340/52; 188/151 A, 1.11

[56] References Cited

U.S. PATENT DOCUMENTS

| | | | |
|---|---|---|---|
| 4,357,054 | 11/1982 | Leiber | 303/DIG. 4 |
| 4,523,791 | 6/1985 | Belart et al. | 303/92 |
| 4,550,954 | 11/1985 | Leiber | 303/DIG. 4 |
| 4,557,528 | 12/1985 | Leiber | 303/92 |

FOREIGN PATENT DOCUMENTS

| | | |
|---|---|---|
| 2411173 | 9/1974 | Fed. Rep. of Germany . |
| 2726640 | 12/1978 | Fed. Rep. of Germany . |
| 3151292 | 7/1983 | Fed. Rep. of Germany . |
| 3236582 | 4/1984 | Fed. Rep. of Germany . |
| 2158905 | 11/1985 | United Kingdom ............... 303/114 |

Primary Examiner—Douglas C. Butler
Attorney, Agent, or Firm—James B. Raden; William J. Michals

[57] ABSTRACT

An apparatus for monitoring the pressure of an auxiliary energy source (10, 11, 12) of a slip-controlled brake system for motor vehicles comprises at least two switches responding when falling below a pressure limit value($p_1$), releasing warning signals and influencing the function of the brake slip control. Through logical operation of the switch functions, failure of a switch (ws1, ws2) will be detected and an error signal derivable therefrom resulting in the partial shut-down or cut-off of the control. The monitoring circuit responds to two different pressure limit values ($p_o$, $p_u$). The brake system is partially shut down or cut off by measuring the interval ($\Delta T$) between the response to the upper and lower pressure limit threshold ($p_o$ and $p_u$, respectively), locking and then switching on the master valves (21, 22), detecting the reaction on turning on again the master valves etc., and by logical operation of the signals.

2 Claims, 3 Drawing Figures

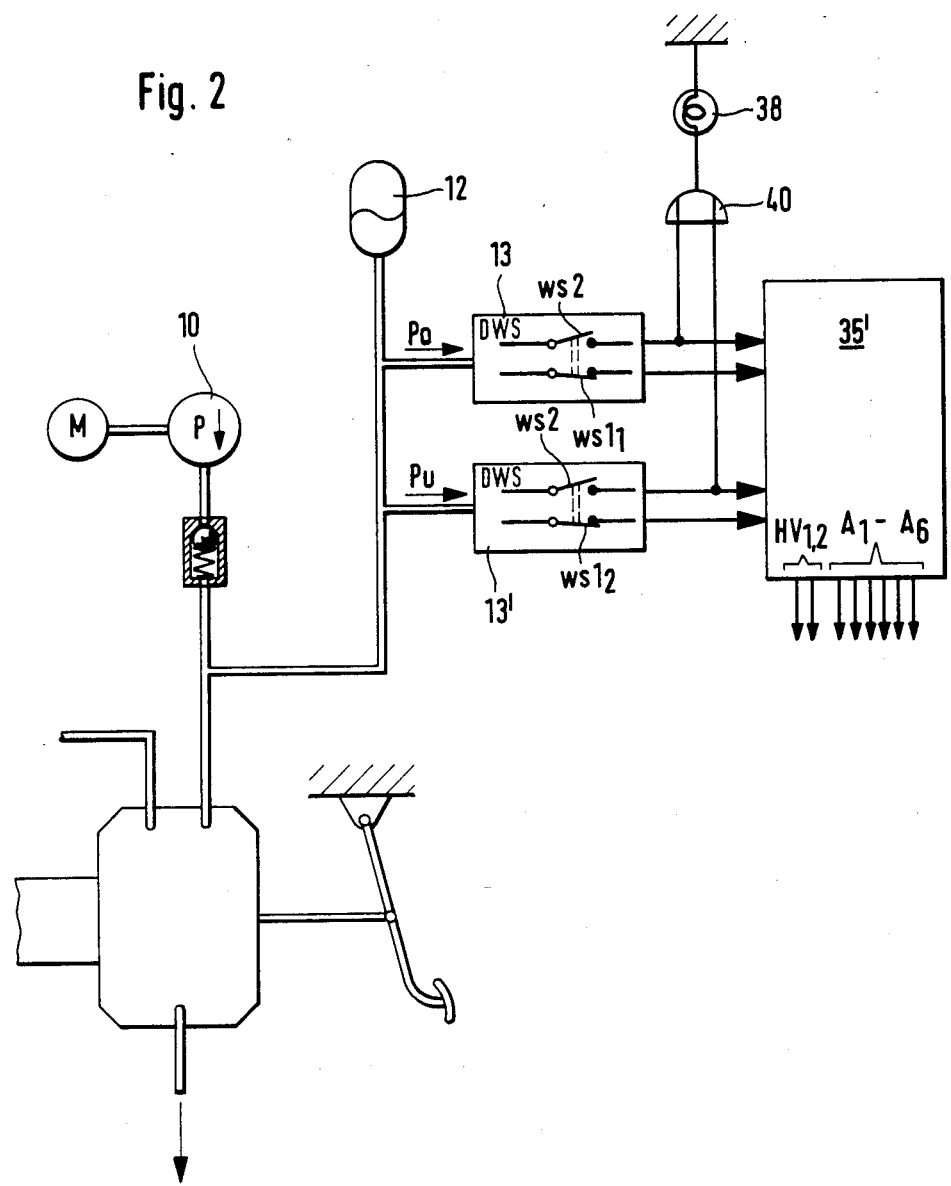

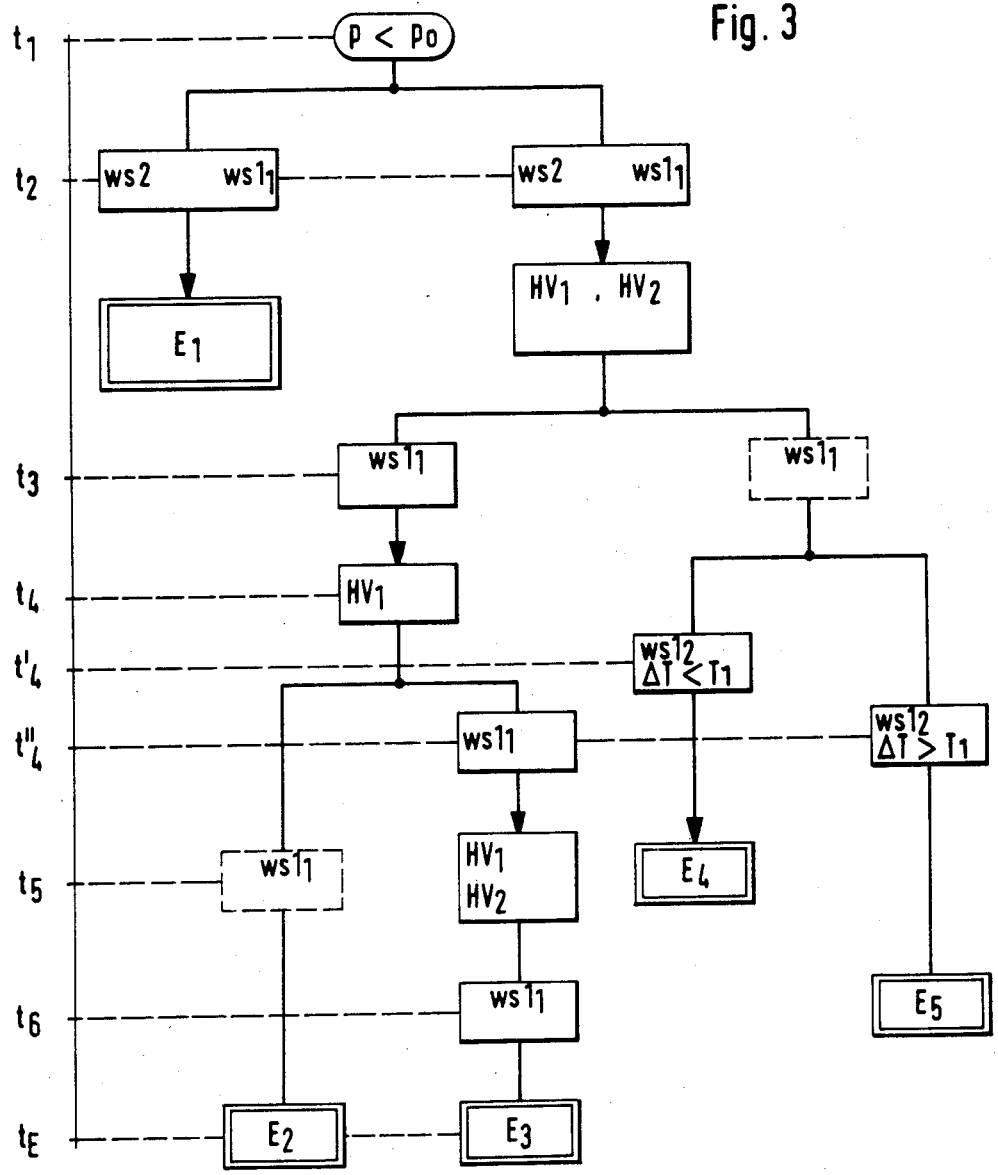

APPARATUS FOR MONITORING THE AUXILIARY ENERGY PRESSURE OF A SLIP-CONTROLLED BRAKE SYSTEM AND SWITCH FAILURE INDICATING ARRANGEMENT THEREFOR

BACKGROUND OF THE INVENTION

The present invention relates to an apparatus for monitoring the pressure of the auxiliary energy source of a slip-controlled brake system for motor vehicles and comprising at least two switches responding in the event of the pressure falling below a pressure limit value and the nominal pressure, respectively, for releasing warning signals and influencing the function of the brake slip control.

In a conventional slip-controlled brake system, locking of a wheel during a braking operation is prevented from occurring by maintaining constant pressure or decreasing the brake pressure transferred by a brake pressure generator, for example, by a master cylinder, to the wheel brakes. In the event of malfunction of the brake slip control, the brake pressure will, therefore, have to be removed or excessively reduced resulting in a dangerous "debraking" operation. Accordingly, monitoring of the brake slip control will be required to ensure that in the event of failure caused by cutting off the control, at least a normal or uncontrolled braking operation of the motor vehicle. A reliable monitoring of the brake slip control is therefore important.

A conventional monitoring device (DE-PS No. 24 11 173) for an anti-locking vehicle brake system is equipped with a pressure sensing element cutting off the control in the event of a pressure decrease in the servo circuit, namely only upon completion of a pending braking operation.

Moreover, it is known in the art to monitor the liquid volume in the supply tank and the pressure in the hydraulic system and, in the event of a defect, to shut down the brake slip control only in part by locking the pressure decrease in the static brake circuits and eliminating the dynamic inflow into the static brake circuits (DE-OS No. 32 32 051). Keeping the pressure constant for reducing the locking risk and controlling the brake slip in the dynamic circuit, under special conditions is possible, at least until completion of the initiated controlled braking operation. However, the prior art arrangements have the disadvantage that a failure of a switch, for example, of the contact operated by the pressure sensor, will not be detected. Therefore, the present invention is directed to the problem of overcoming the disadvantages of the prior art and developing a monitoring device responding in highly reliable manner to and suitably reacting on substantially all occurring defects.

SUMMARY OF THE INVENTION

This object is achieved by means of an aparatus of the above-mentioned type, the special feature of which resides in that by logical operation of the switch functions failure of a switch is detectable and an error signal derivable. A substantially increased reliability and safety of the monitoring device is achieved by these relatively simple measures because a substantial component of the monitoring device itself can now be checked for errors in accordance with the present invention.

According to a preferred embodiment, the monitoring device of the present invention comprises two mechanically coupled contacts which form switches, one contact of which, when falling below the pressure limit value, will generate a brake signal, i.e. a signal indicative of the malfunction of the brake.

The other contact of the switch will release a brake slip control signal, with the logical operation, in the event of a response of only one of the two switches, partially shutting down or cutting off the brake slip control forthwith or with delay. The switches can be formed as two separate, parallel-acting micro-switches, of which one switch will release the brake signal and the other switch will release the brake slip control signal. In another embodiment of the invention, the logical operation, in the event of a failure of a switch, prevents leakage of pressure fluid from the static brake circuits and a brake pressure decrease, respectively, as a result of a controlled operation.

Another solution provided by the present invention resides in that the monitoring circuit of the above-described type responds at least to two switch thresholds associated to different pressure limit values, from which warning signals and signals for influencing the brake slip control function are derivable, with failure of a switch being additionally detectable and analyzable by logical operation of the switch functions. According to another embodiment of the present invention, the monitoring device comprises respectively one switch associated to an upper and to a lower pressure switch threshold that, in the event of falling only below the upper pressure switch threshold, only a warning signal can be released, and in the event of falling below both switch thresholds, a partial shut-down of the brake slip control functions can be released. The response only of the switch associated to the lower switch threshold will detect malfunction of the monitoring device to release the cut-off of the brake slip control. The intervals between the response of the switches, the switch thresholds of which are dependent on different pressure limit values according to another embodiment of the invention, can be evaluated as criteria indicative of the condition of the brake system, with the brake slip control, in response to such intervals, being adapted to be turned off in whole or part and/or can be switched on again. In that respect, it is useful that in the event of a slow pressure decrease (i.e., at an interval exceeding a predetermined minimum value between falling below the upper and the lower pressure switch threshold) the brake slip control can be turned off only after completion of the pending braking operation.

In still another embodiment of brake systems comprising a plurality of static pressure medium circuits into which, in the event of control, pressure can be dynamically fed from the auxiliary energy source by way of separate master valves, the master valves of all static circuits are cut off in the event of a response of the switch associated to the upper pressure limit value, and in the event of a subsequent pressure re-rise beyond the upper pressure limit value caused by alternatingly re-switching on the individual master valves, the defective static pressure medium circuit is detected in response to renewed falling below the upper pressure limit threshold. In the defective static pressure medium circuit, the cut-off of the brake slip control is effected either immediately or with delay, for example, only after completion of the already initiated braking operation.

BRIEF DESCRIPTION OF THE DRAWING

Various other objects, features and attendant advantages of the present invention will be more fully understood from the following description of forms of embodiment when read in connection with the accompanying drawing, wherein:

FIG. 2 is a schematical view simlar to that of FIG. 1 of another embodiment of the invention showing a pressure monitoring device with an upper and a lower pressure limit value; and, FIG. 3 is a flow chart of an embodiment of the signal course of the monitoring device according to FIG. 2.

DETAILED DESCRIPTION

Figure 1:
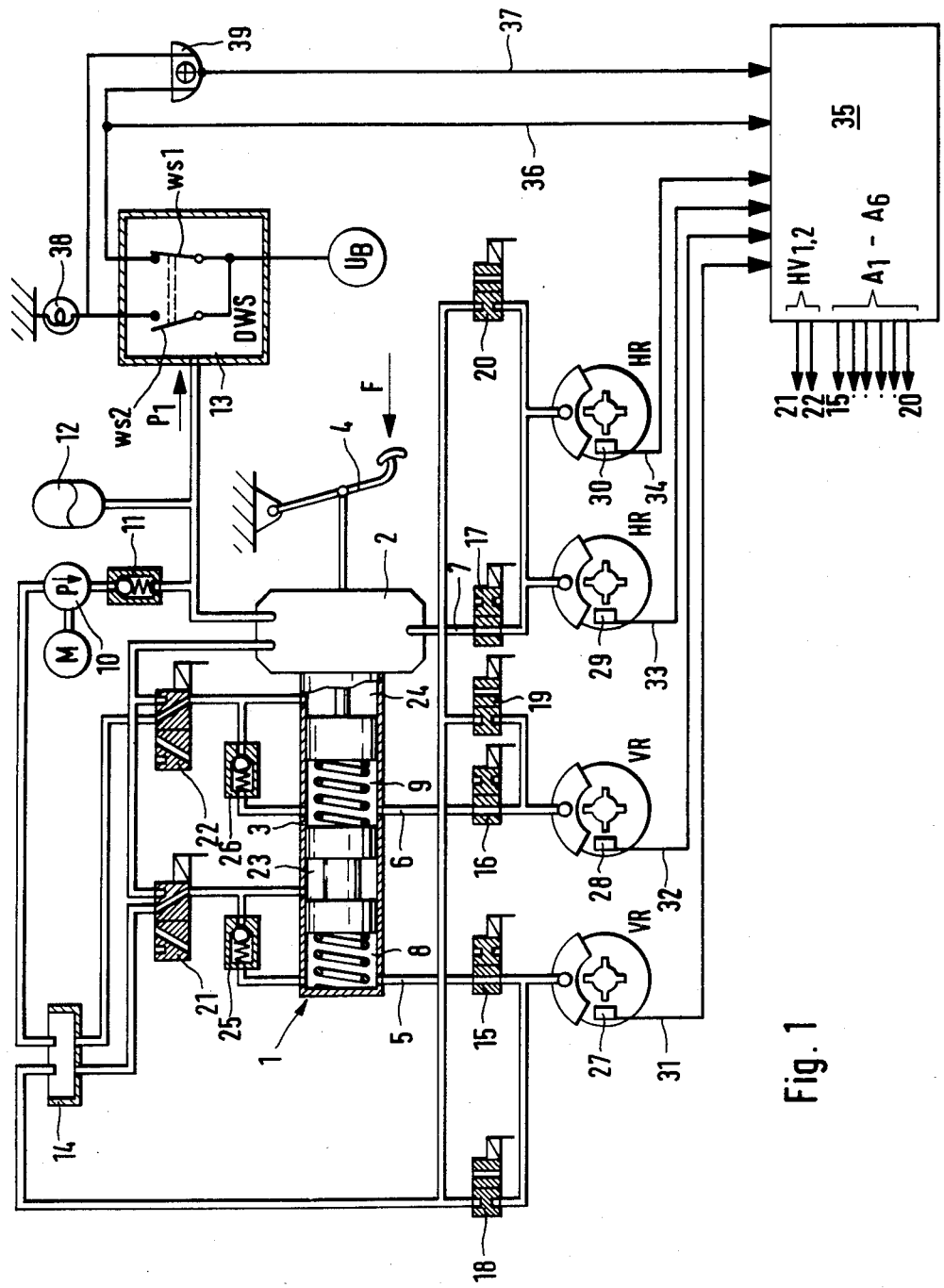
FIG. 1 is a simplified schematic view of the hydraulic and electric wiring diagram of a slip-controlled brake system comprising a monitoring device according to the present invention.

Referring to the drawing, the brake pressure generator of a slip-controlled brake system, in FIG. 1 has been generally designated by reference numeral 1. The brake pressure generator substantially comprises a hydraulic brake booster 2 combined with a tandem master cylinder 3. The pedal force symbolized by arrow F, by way of a standard pedal arrangement 4, if transferred to brake booster 2 and, supported by auxiliary hydraulic force, is transferred in boosted form to master cylinder 3.

Connected to brake pressure generator 1 are three hydraulically separate brake circuits 5, 6 and 7, with the two front wheels VR respectively singly being in communication with a working chamber 8 and 9, respectively, of the master cylinder 3, whereas the two rear wheels HR are jointly associated to the brake circuit 7 directly connected to the hydraulic brake booster 2. The two pressure medium circuits 5 and 6, in the example of embodiment as presently described, hence, are formed as static brake circuits while circuit 7 is formed as a dynamic brake circuit.

The auxiliary energy source of the brake system according to FIG. 1 comprises an electromotive hydraulic pump 10 including the check valve 11, and a hydraulic accumulator 12. The intake side of pump 10 is connected to a supply and pressure compensating tank 14. A so-called pressure warning switch (DWS) 13 is provided for pressure monitoring which, in the example according to FIG. 1, comprises two mechanically coupled contacts ws1, ws2, that is, a resting and a working contact. That Figure shows the switch position in the proper operating condition of the system; in that situation, the pressure in the hydraulic accumulator 12 is above the pressure limit value $p_1$.

For controlling the brake slip, electromagnetically operable 2/2-way valves 15 to 20 are provided in the pressure medium paths from brake pressure generator 1 and supply tank 14 to the wheel brakes, with valves 15 to 17 thereof disposed in the pressure fluid paths leading from brake pressure generator 1 to the wheel brakes, in the resting position, being switched to the passage position, whereas valves 18 and 20 connecting the wheel brakes to pressure compensation tank 14, in the resting position thereof will lock the return and will be energized for a short time only for the forced pressure decrease to counteract an imminent locking thereby being switched to the passage position.

Moreover, in the form of embodiment of the invention as shown in FIG. 1, two so-called master valves 21, 22 are provided formed as 3/2-way valves by way of which, upon the start of the brake slip control, dynamic pressure is fed into the static circuits directly from the auxiliary energy source or, as in the present instance, by way of the hydraulic brake booster 2. For this purpose, annular chambers 23, 24 at the rear sides of the master cylinder pistons, by way of check valves 25, 26 are in communication with working chambers 8 and 9, respectively. Such check valves, in known manner (not shown) can be formed as components of the cups circumferentially of the working piston in the master cylinder 3. In the resting position of the brake slip control, annular chambers 23, 24, by way of non-energized master valves 21, 22 are in communication with pressure compensation tank 14.

The two master valves 21, 22 may be replaced by a single valve of similar construction because, normally, as opposed to the special form of embodiment of the invention described further down with reference to FIG. 3, the dynamic inflow into both static circuits 5, 6 will take place simultaneously.

The rotational behaviour of the individual wheels will be detected by means of the inductive measured value sensors 27 to 30 as shown. The corresponding information, by way of signal lines 31 to 34 will be put into an electronic circuit arrangement 35 where to edit, process and logically operate the signals. Via the output lines $A_1$ to $A_6$ and $HV_{1,2}$ as shown electrical corrective signals will then be applied by way of connecting lines (not shown) as a result of the signal processing, to the 2/2-way valves 15 to 20 and to the master valves 21, 22. The circuit 35 can be realized by a hardware-implemented electronic circuit or by one or more programme-controlled circuits, circuits, e.g. by microcontrollers. In addition, Circuit 35 will perform monitoring functions. For this purpose, this circuit, by way of signal lines 36 and 37, is connected to the pressure warning switch 13.

In the event that the pressure of the auxiliary energy source 10 to 12 decreases to below the pressure limit value $p_1$ the two mechanically coupled contacts ws1, ws2 are at the same time reswitched thereby connecting, by way of ws2, voltage source $U_B$ to a brake warning light 38 flashing of which—irrespective of the function of the brake slip control—is indicative of a defect or of an excessively low pressure in the auxiliary energy supply system of the hydraulic brake force booster. At the same time, by way of switch ws1 and the opening contact, respectively, and by way of signal line 36, the malfunction is reported to the brake slip control.

The simultaneous reswitch of the two switches ws1, ws2, in addition, will be monitored by a gate 39 which, in the present instance, is symbolically demonstrated as an exclusive OR-gate with a NAND-output; consequently, it will feed a signal, by way of signal line 37, into circuit 35 only if both switches ws1, ws2 are simultaneously closed or simultaneously open. An equivalent logical operation can also be achieved in different manner and also in circuit 35 directly.

The form of embodiment according to FIG. 2 is distinguished from the apparatus as described substantially in that, in that case, two pressure limit values, that is, an upper pressure limit value $p_o$ and a lower limit value $p_u$, will be monitored and analyzed. For the sake of simplicity, in the present instance, two identical pressure warning switches 13, 13' merely adjusted to different pressure limit values, have been used. The brake warning light 38 also in that case is caused to flash by way of contacts ws2 of both pressure warning switches 13, 13' linked together by way of an OR-gate 40. The logical operation of contacts ws1 and ws2 has been shifted into circuit 35'.

As opposed to the form of embodiment according to FIG. 1, in this instance, it is of importance that the dynamic inflow into the two static brake circuits 5, 6 be done by way of separate master valves $HV_1$, $HB_2$ because in the embodiment of the invention as described in the following with reference to FIG. 3, only that static circuit is to be rendered inoperative which caused the pressure decrease and the response of the pressure monitoring device. Incidentally, construction and hydraulic circuit of the form of embodiment according to FIG. 2 are identical with those of FIG. 1.

The flow diagram according to FIG. 3 serves to illustrate the signal course and the logical operation when using two pressure warning switches according to FIG. 2 in conjunction with a brake system comprising at least two static brake circuits and respectively one master valve for the dynamic inflow of pressure into the static circuits.

The monitoring device will become effective as soon as at the time of $t_1$ the nominal pressure in accumulator 12 will decrease below the upper pressure limit value $p_o$. If, thereupon, at the time $t_2$ only one of the two switches ws2 or ws1 is reswitched, this will be detected as an error in the monitoring device thereby releasing—symbolized by the end condition $E_1$—directly or with delay, the partial shut-down or cut-off of the brake slip control.

However, if at the time $t_2$, during a controlled braking operation, both switches ws2 and $ws1_1$ respond, i.e. both switches are reswitched, this, according to the invention, will first result in the cut-off of both master valves $HV_1$, $HV_2$, that is, of valves 21 and 22 of the form of embodiment as shown in FIG. 1. If, thereupon, the pressure in accumulator 12 will rise again beyond the upper limit value $p_o$ to cause $ws1_1$ to reclose again at the time $t_3$ (meaning: "$ws1_1$ off"), the master valve $HV_1$, at the time $t_4$, will thereupon again be turned on and energized, respectively. In the event that the pressure remains above the upper limit value $p_o$, the error, apparently, occurred in the circuit of the master valve 2 for which reason the switch condition (end condition $E_2$) released by the monitoring device at the time $t_4$, will be maintained until completion of the controlled braking operation $t_E$ still pending.

However, in the event that after the master valve $HV_1$ having been switched on, switch $ws1_1$ at time $t_5$ will respond again ("$ws1_1$, on"), master valve $HV_1$ thereupon will be locked and master valve $HV_2$ switched on. If the malfunction had occurred in the master valve circuit $HB_1$ the pressure will now rise again so as to cause $ws1_1$ to close again at time $t_6$ (i.e. "$ws1_1$ off"). Such switch condition $E_3$ will now be maintained to the end $t_E$ of the controlled braking operation.

A different course will arise if switch $ws1_1$ will fail to be switched on again at the time $t_3$ and pressure warning switch 13' adjusted to the lower pressure limit value $p_u$ will in place respond at the time $t'_4$. In that case, occurrence of a more serious error in the brake system will have to be expected for which reason—in the event that interval $\Delta T$ between the response of switch $ws1_1$ and switch $ws1_2$ and the pressure decrease to below the upper limit value $p_o$ and below the lower limit value $p_u$, respectively, is short, i.e. it is below a predetermined minimum value $T_1$—the brake system should be immediately turned off or at least partially be rendered inoperative. This has been symbolized by the end condition $E_4$.

If, conversely, it takes relatively long, i.e. longer than $T_1$, until—after response of switch $ws1_1$—also switch $ws1_2$ has reswitched (time $t''_4$), depending on the type of embodiment of the invention, pending partial shut-down or cut-off of the brake system, completion of the already initiated controlled braking operation will be waited or the reaction of the monitoring device is made dependent on criteria of time. Conceivably additional reactions and logical operations have been symbolized by the end condition $E_5$ in FIG. 3.

In another form of embodiment of the invention (not shown), the interval between the response of switch $ws1_2$ and the shut down of the brake system is directly dependent on the interval $\Delta T$, i.e. on the time between falling below the upper and the lower pressure limit value $p_o$ and $p_u$, respectively.

Thus, in accordance with the invention, a substantial improvement of the pressure monitoring of a slip-controlled brake system will be achieved because, on the one hand, errors that will be detected in the monitoring device and because, on the other hand, the reaction (i.e., reswitch and cut-off) can be restricted to only those pressure medium circuits in which the error actually occurs. Moreover, in accordance wtih the invention, a variety of other forms of a partial shut-down will be possible. As the type of error will be analyzed, in the majority of cases, the cut-off of the system will be released only upon completion of the controlled braking operation.

What is claimed is:

1. Apparatus for monitoring the pressure of the auxiliary energy source of a slip-controlled brake system for a motor vehicle having vehicle wheels including wheel brakes, comprising, in combination:

a master cylinder having a cylinder housing forming at least one pressure fluid chamber;

a pedal-operated hydraulic brake booster operatively coupled to said master cylinder;

an auxiliary energy pressure source connected to said brake booster;

a plurality of wheel sensors respectively coupled to each of said vehicle wheels;

a plurality of pressure fluid lines respectively connecting one of said master cylinder and said brake booster with said wheel brakes;

a plurality of electromagnetically operated control valves respectively provided in said fluid lines;

means coupled to said sensors for providing at least one output signal indicative of wheel rotational behavior;

means responsive to said output signal for controlling said control valves to provide slip control;

a pressure-operated warning switch coupled to said auxiliary energy source and providing a warning output signal when the pressure of said auxiliary energy pressure source falls below a predetermined limit value;

means coupled to said control valves and responsive to said warning output signal for varying said slip control;

detecting means coupled to said pressure-operated warning switch for detecting a failure of said warning switch;

means coupled to said detecting means and responsive thereto for providing an error signal indicative of said failure of said warning switch; and, wherein said pressure-operated warning switch comprises a normally open set of contacts coupled between a voltage source and a brake warning light and a normally closed set of contacts coupled between said voltage source and the means for varying said slip control.

2. The apparatus according to claim 1, wherein said pressure-operated warning switch provides said warning output when the pressure of said auxiliary energy pressure source falls below both a first and a second predetermined limit value.

* * * * *